United States Patent [19]

Blahunka

[11] 4,115,757

[45] Sep. 19, 1978

[54] OMNIDIRECTIONAL VISUAL VEHICULAR WARNING SYSTEM

[76] Inventor: Charles Stephen Blahunka, 993 Marlene Ave., Elgin, Ill. 60120

[21] Appl. No.: 682,508

[22] Filed: May 3, 1976

[51] Int. Cl.[2] .......................... G08G 1/00; H04B 7/26

[52] U.S. Cl. ...................................... 340/32; 246/186; 246/29 R; 340/539; 343/711; 343/841

[58] Field of Search .................. 340/225, 32, 33, 278, 340/105, 331; 200/85 A; 343/711, 841, 851, 767, 770, 771, 225; 325/111, 119, 123, 117, 124, 140, 163, 102; 174/35 R, 35 GC, 50; 246/186 R, 29 R, 28 R; 180/99; 191/1

[56] References Cited

U.S. PATENT DOCUMENTS

| | | | |
|---|---|---|---|
| 653,170 | 7/1900 | Coleman | 340/278 |
| 2,206,923 | 7/1940 | Southworth | 343/771 |
| 2,635,188 | 4/1953 | Riblet | 343/771 |
| 2,676,257 | 4/1954 | Hebenstreit | 343/771 |
| 3,117,299 | 1/1964 | Lemm et al. | 343/225 |
| 3,247,482 | 4/1966 | Lesher | 340/32 |
| 3,257,641 | 6/1966 | Campana et al. | 340/32 |
| 3,334,175 | 8/1967 | Vincent | 174/35 MS |
| 3,745,466 | 7/1973 | Pisano | 325/119 |
| 3,895,345 | 7/1975 | Elvers et al. | 340/331 |
| 3,938,045 | 2/1976 | Mathwich | 325/163 |

*Primary Examiner*—John W. Caldwell, Sr.
*Assistant Examiner*—James J. Groody
*Attorney, Agent, or Firm*—William J. Michals

[57] ABSTRACT

A warning system suitable for use with lift trucks, or the like, which routinely transverse hazardous, blind or otherwise dangerous intersections. The system includes a transmitter, which is mounted atop the roll cage of the lift truck, and a receiver which is fixedly mounted within the corresponding zone of the intersection. The transmitter derives its primary power from the vehicle via the vehicle seat switch and radiates a suitable carrier signal through an antenna network which is integral with the transmitter housing. The carrier signal is suitably modulated or encoded by means of a secure modulation format such as FSK. The receiver is disposed at the approximate center of the intersection and includes a carrier and a modulation decoder. The decoded output of the receiver is used to control a visual indicator such as a strobe light. The output of the transmitter is adjusted by way of its antenna network and the receiver sensitivity is further adjusted to establish the desired range limits.

8 Claims, 3 Drawing Figures

OMNIDIRECTIONAL VISUAL VEHICULAR WARNING SYSTEM

BACKGROUND OF THE INVENTION

This invention relates to vehicular warning systems for surface vehicles and, more particularly, to visual vehicular warning systems particularly suitable for use with lift trucks and the like.

Vehicle warning systems for lift trucks as used in warehouses and manufacturing plants are known and have been used in the art. One such system utilizes a warning lamp mounted on the lift truck itself, which lamp, in many arrangements, is electromechanically rotated to provide a more visible, and otherwise effective, visual indication. These warning systems are utilized to provide a visual indication to pedestrians and the like who many be endangered at the various intersections which are routinely traversed by the vehicles. Since these warning lamps are disposed directly on, and fixedly mounted to, the lift trucks, they are subjected to the various vehicle shocks and material handling vibrations. Accordingly, the lamps must be frequently replaced as the component lifetimes are relatively short due to the shocks and vibrations. Further, it has been found that the light intensity outputs of these vehicle-mounted lamps are often insufficient to command the attention of the pedestrains intended to be protected, particularly at blind intersections.

Another known vehicle warning system utilizes loop detectors in the form of a cable which provides a contact closure when the lift trucks cross thereover. The closure provided by the cable loops activates an external indicator device such as a bell, horn or light. These systems suffer from the disadvantages that the initial installation is quite expensive and the installations are restricted to only those areas which are amenable thereto. Further, these systems inherently present maintenance problems due to the continuous wear to which the loop detectors are continuously subjected.

Another known system for providing a vehicle presence warning comprises the use of mirror devices which must be mounted at elevated positions at the intersection in order to permit the lift trucks to pass thereunder while "permitting" the mirror device to be viewed from two or more blind directions. This system suffers from the known disadvantage that pedestrians tend to ignore these devices. That is, pedestrians have a natural tendency not to look in those directions or areas above them which therefore effectively defeats the function of such warning devices.

These and other disadvantages are overcome by the present invention wherein a visual vehicular warning system is provided which includes a sturdy, solid-state transmitter fixedly mounted to each vehicle. The system further includes a receiver at each protected intersection or location which responds to the signal provided by the vehicle-mounted transmitter. The output of the receiver controls an attention-demanding visual light output device.

SUMMARY OF THE INVENTION

Briefly, a visual vehicular warning system for use with surface vehicles of the type which routinely traverse given fixed location areas is provided. The system includes a receiver fixedly mounted at one of the given fixed location areas and the receiver includes an antenna network adapted to detect radiated energy signals of a predetermined frequency the levels of which are above a given minimum signal threshold. The receiver further includes a decoder responsive to the detected radiated signals for providing an output signal indicative thereof. A visual light output device is fixedly mounted in proximity to the receiver and is coupled to receive the output signal. Accordingly, the device illuminates the one given fixed location area in response to the output signal when the decoder responds to the detected signals. The system includes at least one transmitter fixedly mounted to a selected respective one of the surface vehicles and includes an antenna network which is adapted to radiate the energy signals at levels sufficient to exceed the minimum signal threshold when the transmitter is within a given distance from the receiver. Accordingly, the selected one of the surface vehicles is illuminated by the device when transversing the given fixed location area.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
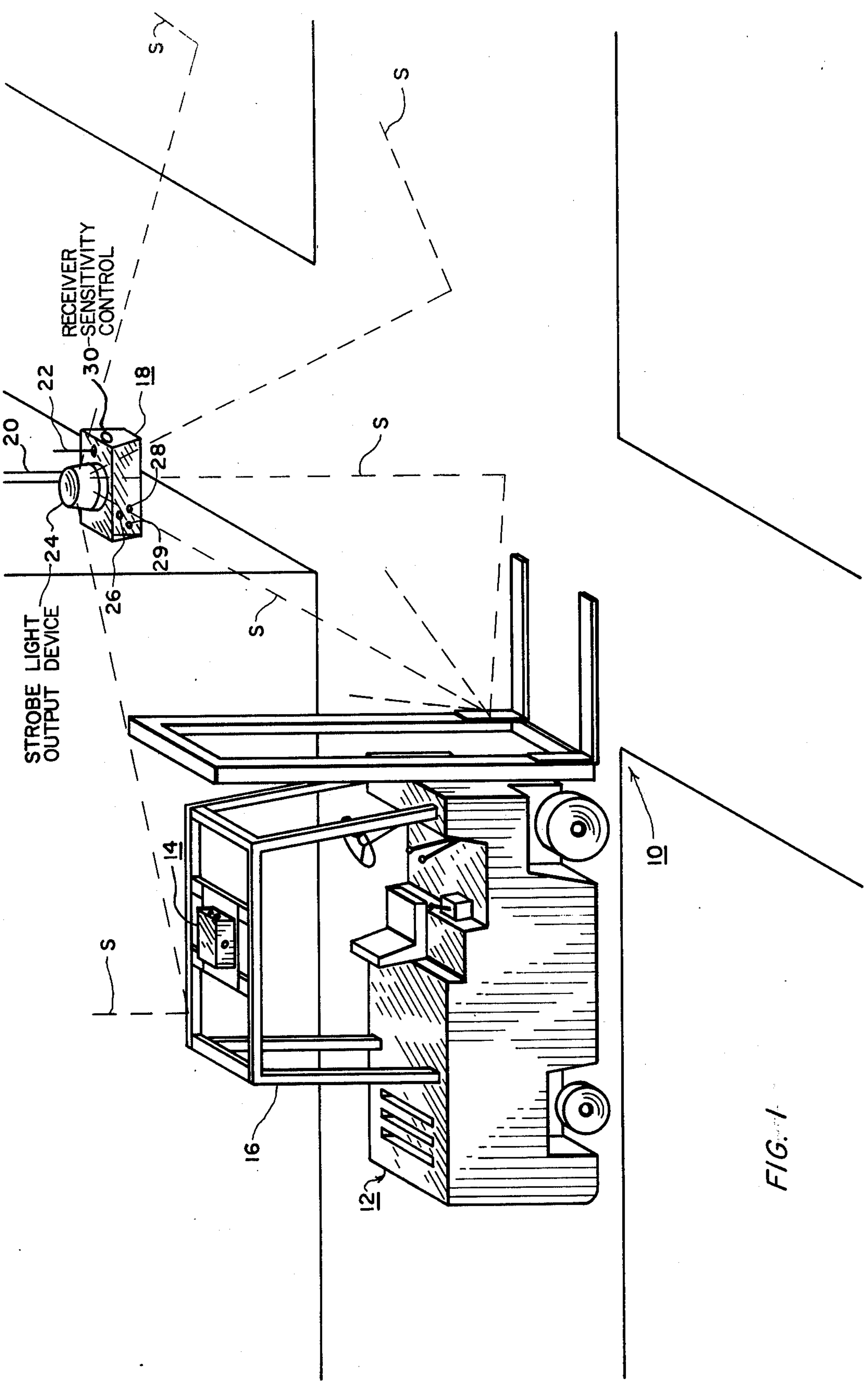
FIG. 1 is a perspective view of an exemplary plant lift truck intersection illustrating a typical lift truck in conjunction with the visual vehicular warning system in accordance with the present invention.

FIG. 1 illustrates at 10 a typical four-way intersection as is generally found in warehouses and manufacturing plants and the like. A lift truck 12 is illustrated as just having entered the intersection 10. A transmitter 14, in accordance with the present invention, is mounted to the upper surface of the roll cage 16 of lift truck 12. This mounting is preferred as it separates the operator from physical contact with the enclosure of the transmitter 14. As will be described more fully hereinafter with reference to FIG. 3, transmitter 14 is provided with an integral radiation output control system formed as an integral part of, or including, the enclosure of transmitter 14.

A receiver 18, in accordance with the present invention, is mounted to a suitable support 20 within the desired area of protection and preferrably at the approximate center of intersection 10. Receiver 18 includes a suitable antenna 22 which is mounted on a given surface of the enclosure of receiver 18. The output of receiver 18 is coupled to and controls a stroboscopic device 24. Device 24 comprises a stroboscope, strobe light or any other suitable high-intensity light output device. In one constructed embodiment, receiver 18 was powered by the conventional AC primary power source of the manufacturing plant. Receiver 18 also included a power-on indicator lamp 26, and on-off switch 28, a fuse 29 and a receiver sensitivity adjustment control 30. In this constructed embodiment stroboscopic device 24 comprised a high-intensity strobe light manufactured by the Tripp Lite Company as model No. ST-110.

Figure 2:
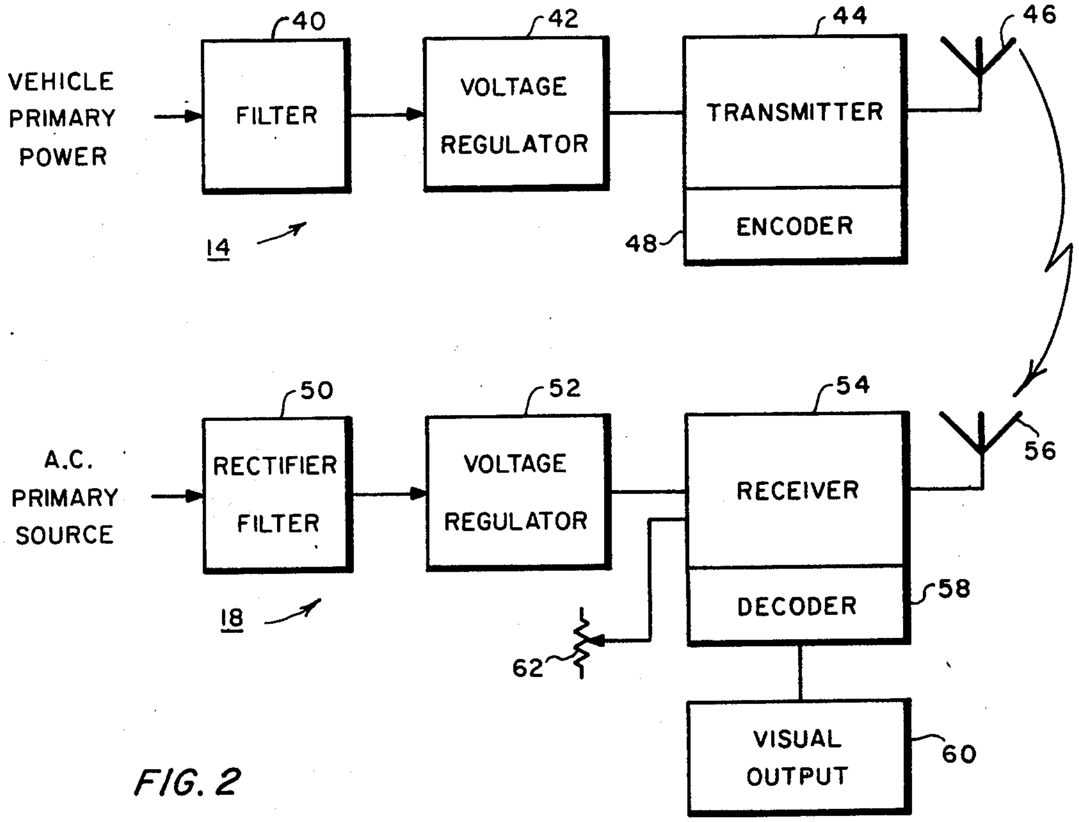
FIG. 2 is a schematic diagram of the system in accordance with the present invention; and, FIG. 3 is a perspective view of a transmitter enclosure illustrating a novel signal output control technique in accordance with another feature of the present invention.

Referring now to FIG. 2, there is shown a combined schematic and block diagram of the visual vehicular warning system in accordance with a preferred embodiment of the present invention. The transmitter 14, which derives its primary power from the lift truck or vehicle, includes a filter 40 which functions to decouple or remove the high voltage transients found in typical vehicle primary power systems. The output of filter 40 is coupled to a voltage regulator 42 which provides a substantially fixed operating potential for the transmitter 14. Transmitter 14 includes means 44 for generating an RF signal —or any suitable electromagnetic, sonic or ultrasonic signal —which is radiated by antenna network 46. An encoder 48 is coupled to transmitter means 44 to modulate the radiated carrier with a secure modulation format such s FSK. In one preferred embodiment, the vehicle primary power is applied to transmitter 14 by means of a "dead-man's" switch arrangement activated by the vehicle seat. That is, when an operator is sitting on the vehicle seat power is applied, by way of a seat switch, to transmitter 14. Hence, when the operator leaves the vehicle, power is removed and the system, in accordance with the present invention, is no longer activated. Of course, the power may also be applied to the transmitter by more conventional means, such as the vehicle ignition switch, to suit a given application in accordance with the present invention.

Still referring to FIG. 2, receiver 18 of the visual vehicular warning system, in accordance with the present invention, includes a rectifier and filter 50 which is coupled to receive the AC primary power source. The output of rectifier/filter 50 is coupled to a voltage regulator 52 which provides a substantially fixed operating potential at the output thereof. Receiver means 54 are coupled to an antenna network 56 so s to receive the radiated energy signals provided by transmitter 14. Receiver means 54 detects the carrier signal and a decoder 58 responds to the modulation format of the signal provided by transmitter 14 to provide an output signal indicative thereof. The output signal of decoder 58 is coupled to a visual light output device 60 which responds to the output signal of decoder 58. Receiver means 54 further includes a sensitivity control 62 which determines the detection threshold of receiver means 54 and/or decoder 58 for a given input signal to receiver means 54. In the abovementioned constructed embodiment, transmitter 14 and receiver 18 were constructed for operation with the 265 to 285 $MH_z$ RF range.

In operation, the system in accordance with the present invention, is adjusted such that receiver 18 provides an output to visual output device 60 when the lift truck or vehicle is within a given predetermined distance from the protected intersection. The threshold is established by adjusting the receiver sensitivity such as by means of control 62 and by adjusting the transmitter or radiated output signal from transmitter 14. Accordingly, as the lift trucks approach the intersection and pass within the given predetermined distance, the output of receiver 18 activates stroboscopic device 24 which therefore illuminates the entire hazardous intersection. It has been found that the strobe light in accordance with a preferred embodiment of the present invention provides a dramatic pulsating light which illuminates substantially the entire intersection including the equipped vehicle when it transverses the intersection. This observed phenomenon is graphically illustrated in FIG. 1 wherein vectors S represent the illuminating output of device 24. Thus, a visual light indication is provided in every possible direction to which a pedestrian may have his attention directed. That is, it has been found that the strobe light output provides an indication which is virtually impossible to ignore. It has also been found that the output of the strobe light is readily reflected off of walls, partitions and even stored boxes and other materials, thereby to provide an even more ubiquitous warning signal.

Figure 3:
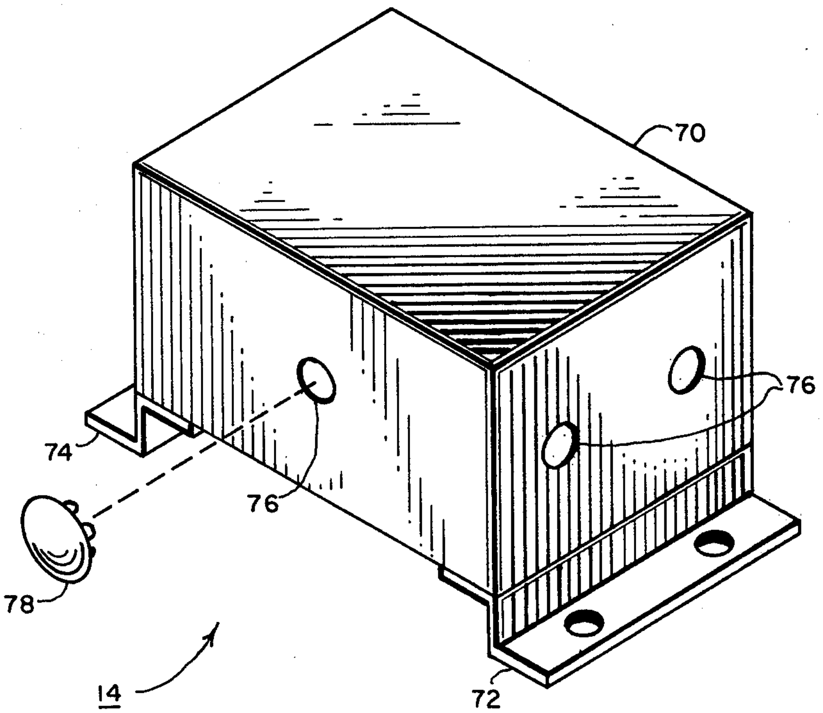

Referring now to FIG. 3, there is illustrated a preferred enclosure for transmitter 14 in accordance with a further feature of the present invention. The enclosure 70 of transmitter 14 is provided with suitable mounting brackets 72 and 74 at opposite ends thereof. Enclosure 70 is provided as a suitable sheet metal fabrication which functions as a screen to inhibit the radiation of RF signals which are generated within enclosure 70. It will be appreciated by those skilled in the art, however, that such a radiation shielding enclosure can also be provided utilizing a plastic enclosure wherein a suitable wire mesh or screen is provided within or without the enclosure 70.

Given surfaces of enclosure 70 are provided with apertures or holes 76. The size of holes 76. The size of holes 76 are selected to receive metallic plug buttons 78 having resilient spring mounting means thereon. Plug buttons 78 are either inserted or removed to provide a means for controlling the radiation output of transmitter 14. That is, the radiation producing portion of transmitter 14 is disposed within enclosure 70 such that the generated RF signals are propogated through the openings or holes 76 of enclosure 70. Thus, by removing one or more of plug buttons 78, the overall radiation provided by transmitter 14 can be increased. Conversely, the radiation from transmitter 14 can be decreased by inserting one or more of plug buttons 78. It will now be appreciated by those skilled in the art that any desired number of holes 76 can be provided on enclosure 70 to obtain a desired range of radiation output control. It will also be appreciated by those skilled in the art that enclosure 70 may be isolated from the antenna or propagation surface of transmitter 14; or, enclosure 70 may also form an integral portion of the antenna which functions to directly "load" the output of transmitter 14.

What has been taught, then, is a visual vehicular warning system suitable for use with surface vehicles of the type which routinely traverse given fixed location areas. The invention facilitates, notably, lift trucks as are found in industrial warehouses and manufacturing plant locations which traverse hazardous intersections therein including blind and four-way intersections.

The form of the invention illustrated and described herein is but one preferred embodiment of these teachings in the form currently preferred for manufacture. It is shown as an illustration of the inventive concepts, however, rather than by way of limitation, and it is pointed out that various modifications and alterations may be indulged in within the scope of the appended claims.

What is claimed is:

1. A visual vehicular warning system for use with surface vehicles of the type which routinely traverse given fixed location areas comprising:

a receiver fixedly mounted at one of said given fixed locations areas, said receiver having an antenna network being adapted to detect radiated energy signals of a predetermined frequency the levels of which are above a given minimum signal threshold, and said receiver having a decoder responsive to the detected radiated signals for providing an output signal indicative thereof;

a visual light output device providing a substantially omnidirectional pulsating light output and being fixedly mounted in proximity to said receiver and coupled to receive said output signal, wherein said device illuminates substantially entirely said one given fixed location area in response to said output signal when said decoder responds to said detected signals; and, at least one transmitter fixedly mounted to a selected respective one of said surface vehicles and continuously generating said energy signals when said one of said vehicles is moving, said transmitter having an antenna network and being adapted to continuously radiate said continuously generated energy signals but at levels sufficient to exceed said minimum signal thresold only when said transmitter is within a give distance from said receiver, wherein said selected one of said surface vehicles is substantially continuously pulsatingly illuminated by said pulsating light output of said device when traversing said given fixed location area, and wherein said transmitter is powered by the primary power source of said one of said vehicles and wherein said one of said vehicles includes a seat switch coupled between said primary power source and said transmitter to provider an operator responsive on-off switch which applies power to said transmitter when said switch is closed.

2. The warning system according to claim 1, wherein said receiver includes means for adjusting the level of said detected signals.

3. The warning system according to claim 1, wherein said transmitter includes an enclosure having integral means for adjusting the level of the radiated energy signals of said transmitter.

4. The warning system according to claim 3, wherein said means for adjusting includes a plurality of apertures disposed on given surfaces of said enclosure wherein each aperture is adapted to receive a movable device for closing said aperture.

5. The warning system according to claim 4, wherein said movable device is a plug button.

6. The warning system according to claim 1, wherein said visual light output device is a stroboscopic light source.

7. The warning system according to claim 1, wherein said decoder is responsive to a selected FSK modulation format and wherein said transmitter includes means for encoding said radiated energy signals with an FSK modulation format.

8. A vehicular warning system for use with lift truck surface vehicles of the type which routinely traverse given fixed locations comprising:

a receiver fixedly mounted at one of said given fixed locations, said receiver having an antenna network and being adapted to detect radiated energy signals of a predetermined frequency and above a given minimum signal threshold, and said receiver having a decoder responsive to the detected radiated signals for providing an output signal indicative thereof;

a visual light output device providing a substantially omnidirectional pulsating light output and being fixedly mounted in proximity to said receiver and coupled to receive said output signal, wherein said device illuminates substantially entirely said one given fixed location in response to said output signal, and at least one transmitter fixedly mounted to the upper surface of the roll cage of one of said surface vehicles and continuously generating said energy signals when said one of said vehicles is moving, said transmitter having an antenna network integrally formed with an enclosure of said transmitter and being adapted to continuously radiate said continuously generated energy signals but at levels sufficient to exceed said minimum signl threshold only when said transmitter is within a given distance from said receiver and wherein said one of said surface vehichles is substantially continuously pulsatingly illuminated by the pulsating light output of said device throughout the interval when said one of said surfce vehicles is traversing said one given fixed location, said transmitter including an enclosure having integral means for adjusting the levels of the radiated energy, and wherein said transmitter is powered by the primary power source of said one of said vehicles and wherein said one of said vehicles includes a seat switch coupled between said primary power source and said transmitter to provide an operator responsive on-off switch which applies power to said transmitter when said switch is closed.

* * * * *